United States Patent [11] 3,615,687

[72] Inventors Kazuo Mochizuki
 Takarazuka;
 Kazuko Isobe, Osaka; Yoshio Sawada,
 Fukushima, all of Japan
[21] Appl. No. 663,946
[22] Filed Aug. 29, 1967
[45] Patented Oct. 26, 1971
[73] Assignee Takeda Chemical Industries, Ltd.
 Osaka, Japan
[32] Priority Aug. 29, 1966
[33] Spain
[31] 330,686

[54] METHOD FOR PRODUCING CANDIED FRUITS
 9 Claims, No Drawings
[52] U.S. Cl. .................................................... 99/102,
 99/102, 99/106
[51] Int. Cl. ...................................................... A23l 1/06
[50] Field of Search ........................................... 99/102,
 103, 106; 195/29, 31, 65

[56] References Cited
 UNITED STATES PATENTS
 2,832,688 4/1958 Huang .......................... 99/106
 3,307,954 3/1967 Blakemore .................. 99/103
 3,482,995 12/1969 Hori ............................. 99/102
 OTHER REFERENCES
 Industrial Microbiology 3rd ed. pp. 528, 529, 858 & 859 Prescott & Dunn 1959
 Encyclopedia of Chemical Technology Vol. 8 1965 (Kirk-Othmer.) pg. 210
 Textbook of Biochemistry pp. 444– 445 West 1957
 Chemistry of Biology of Proteins pp. 248– 249. Haurowitz 1950

*Primary Examiner*—Norman Yudkoff
*Assistant Examiner*—Martin G. Mullen
*Attorney*—Wenderoth, Lind & Ponack ABSTRACT: The time required for candying fruits such as cherries, apricots, plums, prunes and jujubes is remarkably shortened by preliminarily immersing the said fruits in an aqueous solution of the enzymatic composition produced by the cultivation of *Aspergillus niger* and thereafter carrying out the candying process.

In this invention, materials containing the enzymatic composition, e.g. culture broth or culture filtrate, are employed as such without subjecting the materials to any further treatment when the pectinase activity, the cellulase activity and the protease activity are sufficiently high.

In the method of this invention, the time for the candying is shortened by increasing the rate of the impregnation of the fruits with sugar without causing the shrinking of the fruits by treating sap fruits as starting material with the enzymatic composition at a state not later than the candying in the processes for producing candied fruits. The effect of shortening the period of the candying process by the method of this invention is found in all cases of employing sap fruits usable as starting material for producing candied fruits. However, the effect of this invention is especially remarkable in cases of employing stonefruits such as cherry, apricot, plum, prune, jujube and peach, and among the stonefruits, relatively small stonefruits such as cherry, plum, apricot are more suitable as the starting material in the process of this invention. In case of employing cherries as starting material in the process of this invention, the period of time required in order to have cherries impregnated with sugar to make the sugar concentration of cherries approximately 72 percent by weight is shortened to about 4 or 5 days without causing the shrinking of cherries, as described in example 1, while at least 3 weeks are required for the same purpose according to the conventional process which does not include the treatment with the enzymatic composition.

In the process of this invention, the enzymatic treatment which comprises bringing sap fruits as starting material into contact with the enzymatic composition should be adopted not later than starting of the candying process. Practically, the enzymatic treatment can be carried out at a suitable stage in the process of preparing fruits before candying or at an early stage of the candying. Since the enzymatic composition brings about not only shortening of the period for candying but bleaching of the fruits in cases of preparing candied fruits such as Maraschino-type cherries, which require a bleaching process before the candying, both effects of shortening the period of candying and of bleaching the fruits are brought about by the above-mentioned enzymatic treatment. Practically, the enzymatic treatment is carried out by immersing sap fruits in an aqueous solution containing the enzymatic composition. The aqueous solution employed in the enzymatic treatment advantageously contains between about 0.01 percent and 0.5 percent by weight of the enzymatic composition so far as the enzymatic composition has pectinase activity of higher than about 50 units and cellulase activity of higher than about 10,000 units and protease activity of higher than about 5,000 units per gram. The enzymatic treatment is preferably carried out at a temperature between about 20° C. and about 50° C. and at pH between about 2.0 and about 6.0 under stationary conditions. The period for the enzymatic treatment varies with the kinds of sap fruits used as starting material, the amount of sap fruits, the concentration of the enzymatic composition employed, etc. In general, 1 to 3 days are sufficient for the completion of impregnation of the fruit with the enzymatic composition.

When the enzymatic treatment is carried out simultaneously with the candying procedure, the sap fruits are immersed in a sugar sirup to which is added enzymatic composition, at an early stage of the candying.

Sap fruits impregnated with the enzymatic composition can be impregnated with sugar in a shorter period of time. Thus, the sugar concentration in the sirup can be increased rapidly in the candying process of this invention, and accordingly it is possible that the period of the candying is shortened to about between one-third and one-sixth of that in hitherto-employed processes, without causing shrinking of sap fruits and without causing excessive softening of sap fruits.

The following examples are shown only for illustrative purposes and are not intended to limit the scope of this invention. In the examples percent means weight percent unless otherwise noted, and tee pectinase, cellulase and protease activities of the enzymatic composition are assayed by the above-mentioned methods, respectively.

EXAMPLE 1

10 kilograms of cherries are preserved in 10 liters of aqueous brine containing 3 percent of sodium hydrogen sulfite and 0.1 percent of calcium chloride, adjusting the concentration of sulfur dioxide in the brine to above 0.7 percent by the addition of sodium hydrogen sulfite. After about 3 months storage, the cherries are pitted and stemmed, and then immersed in about 10 liters of 1 percent calcium chloride solution to harden the tissues of the cherries. The cherries are heated to boiling with incessant changing of water to reduce the sulfur dioxide below 500 p.p.m.

On the other hand, 20 grams of wheat bran and 20 milliliters of water are mixed in a 500 milliliter flask. The mixture is sterilized by heating at 120° C. under pressure for 30 minutes. *Aspergillus niger*(ATCC No. 10254) is inoculated in the above-prepared medium and then incubated for 5 days at 28° C. After incubation, the cultured broth is extracted with water, and the aqueous layer is separated by filtration.

To the filtrate there is added acetone of twice the volume of the filtrate to give precipitates. The precipitates are separated by filtration, and dried to give a white powdery enzymatic composition which has 320 units/gram of pectinase activity, 750,000 units/gram of cellulase activity and 5,500 units/gram of protease activity, respectively. 22 grams of thus-obtained enzymatic composition is dissolved in 10 liters of water, and then the solution is adjusted to pH 3.0 by the addition of citric acid.

The cherries are immersed in thus-prepared enzymatic solution for 24 hours at 28° C. After the enzymatic treatment, the cherries are transferred into 10 liters of water. 250 milliliters of dye solution containing 3.5 grams of Erythrosin (commercially available red dye of Hodogaya Kagaku Kabushiki Kaisha, Japan) is added to the mixture, while keeping the temperature at 80° C. The mixture is kept standing at the same temperature for 40 minutes, and then 100 milliliters of 1 percent aqueous tartaric acid solution is added to the mixture. The mixture is further heated at 80° C. for 40 minutes, whereby the cherries are dyed and the enzymes in the cherries are inactivated. The cherries are immersed in 10 liters of 40 percent aqueous sucrose sirup. The mixture is allowed to stand at about 50° C. for 24 hours, then the whole portion of sirup is drained from the immersion tank and the sucrose concentration of the sirup is made up to 60 percent by the addition of sucrose. The cherries are again immersed in the 60 percent sucrose sirup and then the mixture is allowed to stand at about 50° C. After 24 hour immersion, the sirup is drained from the immersion tank and the sucrose concentration of the sirup is made up to 70 percent by the addition of sucrose. After 24 hour immersion in the 70 percent sirup, the sirup is increased to 80 percent of sucrose in the manner described above. After 24 hour immersion, the sirup is readjusted to 80 percent of sucrose by the addition of sucrose, and then the immersion is further continued for 24 hours.

By the above-mentioned candying for 5 days, the concentration of sucrose in the cherries has reached approximately 72 percent without shrinking the cherries. The thus candied thus-candied are taken out of the sirup and dried by a conventional method.

In comparative tests wherein the candying is carried out without previously performing the above-mentioned enzymatic treatment, 21 days are required in order to have cherries impregnated with sucrose until sucrose concentration of the cherries reaches approximately 72 percent without causing shrinking of the cherries.

EXAMPLE 2

100 liters of liquid medium consisting of 3 percent of soybean flour, 5 percent of blackstrap molasses, 0.2 percent of 3,615,687

METHOD FOR PRODUCING CANDIED FRUITS

This invention relates to a method for producing candied fruits.

According to this invention, the enzymatic composition produced by *Aspergillus niger* is capable of facilitating the candying of fruits, when applied to the latter in the process of preparing candied fruits. Moreover, according to this invention, the time required for candying the fruits is remarkably shortened.

According to known methods, candied fruits are prepared by the following procedure:

Fruits are gathered before they are fully mature. Fresh fruits are stored in a dilute solution of sulfurous acid or sulfur dioxide and a lime solution for the purposes of bleaching the color and hardening the tissues, and for their preservation. Fruits preserved in the above-mentioned solution are thoroughly leached in hot water to remove sulfur dioxide before starting the candying process. Cherries are stemmed and carefully pitted before leaching. Apricots are pitted without cutting the fruits in half. Plums, prunes, and other whole fruits are often picked with copper wires. In the case of preparing candied peaches, fresh fruits and canned fruits are used without the intermediate step of storage in sulfurous acid. The fruit prepared by the above-mentioned treatment in sulfurous acid and boiling to render it tender, or by boiling of the prepared fresh fruit, is placed in a sirup containing sucrose and/or glucose in a relatively low concentration. Canned fruits are placed in this sirup directly from the can, namely, those fruits are immersed into the sirup at the sugar concentration thereof. For example, the fruit is placed in a sirup containing approximately 25 percent by weight of sucrose and/or glucose. The mixture is allowed to stand at a temperature of about 30° to 60 °C. After 24 hours or longer immersion, the sirup is drained from the fruit and is made up to approximately 30 percent by weight by the addition of sucrose and/or glucose. The mixture is again allowed to stand for 24 to 48 hours. The sirup is then increased to 35 percent by weight in the manner described above, and the fruit is allowed to stand for another 24 hours. The process is repeated on succeeding days, with an increase of 5 percent by weight each day until the sirup has reached approximately 80 percent. This concentration is maintained until the fruit and sirup have thoroughly equalized in sugar concentration. The fruit is maintained in this heavy sirup at least 3 weeks until it becomes plump and impregnated with the sirup. In this candying process the sugar concentration of the sirup should be increased gradually, since rapid increase causes shrinking of the fruits.

As mentioned above, the candying process requires a long period of time in hitherto-employed processes for producing candied fruits. A few improvements have been proposed for shortening the period required for the candying, for example, a process wherein fruits are cooked in sirup in the candying process, and a process wherein fruits are blast-frozen and candied under heating at about 66° C. However, these hitherto-proposed processes are not considered as industrially profitable ones, owing to such drawbacks as that these processes require complicated installations and that candied fruits obtained by these processes are bad in quality.

This invention provides a remarkable improvement for shortening the period of time required for the candying. The object of this invention is realized by treating sap fruits used as starting material with the enzymatic composition produced by *Aspergillus niger*, at a stage not later than starting the process for candying fruits.

Hereinafter, an enzymatic composition capable of shortening the period of time required for the candying of fruits, prepared by the cultivation of *Aspergillus niger* is simply referred to as "the enzymatic composition." The enzymatic composition can be produced by cultivating *Aspergillus niger*, which is available from Northern Utilization Research Branch, U.S. Department of Agriculture, Peoria, Ill., (NRRL); American Type Culture Collection, Rockville, Maryland, (ATCC); or Institute for Fermentation, Osaka Japan (IFO) or may be isolated from a natural source.

The *Aspergillus niger* can be incubated in a liquid or solid medium, and it is generally cultured either under static conditions or in a submerged process under aeration and/or agitation.

The culture medium employable should contain carbon and nitrogen sources which are assimilable by *Aspergillus niger*. Examples of assimilable carbon sources are starch, dextrin, sucrose, lactose, maltose, glucose, blackstrap molasses, sawdust and glycerol. Examples of assimilable nitrogen sources are such inorganic or organic sources as ammonium salts, various kinds of nitrates, cornsteep liquor, peptone, polypeptone, meat extract, soybean cake, soybean flour, wheat flour, wheat bran, rice bran, yeast extract, urea or various amino acids. In addition, mineral salts such as calcium salts, magnesium salts, potassium salts, sodium salts, zinc salts, copper salts or iron salts, vitamins or other growth-promoting factors may be added to the culture medium as accessory nutrients.

The incubation is desirably carried out at a temperature of about 25° C. to about 32° C. and the maximum amount of the enzymatic composition usually accumulates in the culture broth after several tens of hours to several hundred hours of incubation. The optimal pH value of the medium is generally about 3 to 6.

The greater part of the enzymatic composition produced is accumulated in the culture medium coming out of the cells of *Aspergillus niger*. Accordingly, when the incubation is carried out with the use of a liquid medium it is advantageous to filter or centrifuge the whole culture broth and, if required, to subject the resultant cleared broth to further recovery procedures. When the incubation is carried out with the use of a solid medium, it is advantageous to extract the culture broth with water and, if required, to subject the resultant extract to further recovery procedures.

Generally known means for recovering enzymes from their solution can be applied to the recovery of the enzymatic composition from the said cleared broth or the culture extract. The enzymatic composition can be absorbed on various adsorbents, or precipitated by some precipitants. Moreover, general means for recovery such as precipitation near the isoelectric point, salting out or dialysis, or a combination thereof, may be effected for the purpose of recovery and purification.

Practically, the recovery and the purification of the enzymatic composition contained in the cleared broth or the culture extract is effected by the addition of an inorganic salt such as sodium sulfate, ammonium sulfate or an hydrophilic organic solvent such a methanol, ethanol, normal propanol, acetone, etc. to the cleared broth or to the culture extract, and by collecting the resulting precipitates. When an inorganic salt is employed, about 20 percent to about 70 percent saturation of the inorganic salt give best results. In case of a hydrophilic organic solvent, the organic solvent is desirably added so as to make its final concentration relative to the whole volume to a range from about 30 percent to about 70 percent.

The enzymatic composition is composed of many kinds of enzymes, e.g. pectinase, protease, cellulase, hemicellulase, peptidase, glucanase, RNA depolymerase, sucrase, maltase, lactase, xylanase, inulase, dextranase, mannase, $\alpha$-amylase $\beta$-amylase, lipase and cellobiase.

The enzymatic composition is preferably employed after being purified at least to make its pectinase activity higher than about 50 units per gram when assayed according to the method described in "Kōsokenkyuhō (Techniques of studying enzymes)" volume 2, p. 164 (1963) published by Asakura Shoten, Japan; its cellulase activity higher than about 10,000 units per gram when assayed according to the method described in "Journal of Fermentation Technology" volume 40, p. 45 (1962) published by The Society of Fermentation Technology, Japan; and is protease activity higher than about 5,000 units per gram when assayed according to the method described in "Journal of General Physiology" volume 22, p. 79 (1938) except that the reaction temperature and pH are 45° C. and 2.5, respectively.

ammonium sulfate, 0.2 percent of potassium dihydrogen phosphate and 0.1 percent of magnesium sulfate is sterilized by heating at 120° C. under pressure for 20 minutes; then *Aspergillus niger* (Atcc No. 9642 ) is inoculated in the above-prepared medium, and incubation is carried out at 30° C. by agitating under aeration for 120 hours. The culture broth is subjected to filtration, and to the resulting filtrate there is added ammonium sulfate up to 65 percent saturation to yield precipitates. The precipitates are collected by filtration and dried at 35° C. to give a powdery enzymatic composition which has 165 units/gram of pectinase activity, 250,000 units/gram of cellulase activity and 43,500 units/gram of protease activity, respectively.

10 kilograms of fresh cherries are immersed in 10 liters of an aqueous solution of pH 4.0 containing 0.2 percent of the above-prepared enzymatic composition, at 25° C. for 2 days. The cherries are pitted and stemmed, and then immersed in 10 liters of 1 percent calcium chloride solution to harden the tissues of the cherries. The hardened cherries are dyed and candied for 5 days in the same way as in example 1, whereby the concentration of sucrose in the cherries reaches approximately 70 percent without causing shrinking of the cherries. Then the cherries are taken out of the syrup and dried by a conventional method.

EXAMPLE 3

10 kilograms of plums are preserved in 10 liters of the same brine as in example 1 for 3 months. After being taken out of the brine, the plums are picked with copper wires, and then immersed in 10 liters of an aqueous solution of pH 3.7 containing 0.1 percent of the same enzymatic composition as employed in example 1 at 45° C. for 2 days. Plums thus treated are transferred into 10 liters of water, followed by heating at 80° C. for 2 hours to inactivate the enzymes remaining in the plums. The plums are candied for 5 days in the same way as in example 1, whereby the concentration of sucrose in the plums reaches approximately 70 percent without causing the shrinking of the plums. The plums thus candied are taken out of the sirup and dried by a conventional method.

In comparative tests wherein the candying is carried out without previously performing the above-mentioned enzymatic treatment, 22 days are required in order to have plums impregnated with sucrose until the concentration of sucrose in the plums reaches approximately 70 percent without causing shrinking of the plums.

EXAMPLE 4

10 kilograms of apricots are preserved in 10 liters of the same brine as in example 1 for 3 months. After being removed from the brine, the apricots are pitted. The apricots are immersed in 10 liters of an aqueous solution of pH 4.2 containing 0.2 percent of the same enzymatic composition as employed in example 1, at 40° C. for 2 days, and then the apricots are transferred into 10 liters of water, followed by heating at 80° C. for 2 hours to inactivate the enzymes remaining in the apricots. The apricots are candied for 6 days in the same way as in example 1, whereby the concentration of sucrose in the apricots becomes approximately 70 percent without causing shrinking of the apricots. The apricots thus candied are taken out of the sirup and dried by a conventional method.

In comparative tests wherein the candying is carried out without previously performing the above-mentioned enzymatic treatment, 23 days are required in order to have apricots impregnated with sucrose until the concentration of sucrose in the apricots reaches approximately 70 percent without causing shrinking of the apricots.

Having thus disclosed the invention, what is claimed is:

1. In a process for producing candied fruits by candying sap fruits, the improvement wherein sap fruits as the starting material are immersed in an aqueous solution containing an enzymatic composition prepared by the cultivation of *Aspergillus niger*, which is incubated with a culture medium which contains assimilable carbon and nitrogen sources at temperatures between 25° and 32° C., at a stage not later than the starting of candying.

2. The improvement according to claim 1, wherein the immersion is carried out with an aqueous solution containing between about 0.01 percent and about 0.5 percent by weight of the enzymatic composition at a pH value of between about 2.0 and about 6.0 at a temperature of about between 15° C. and 50° C.

3. The improvement according to claim 1, wherein the sap fruits are stonefruits.

4. The improvement according to claim 3, wherein the stonefruit is selected from the group consisting of cherry, apricot, plum, prune and jujube.

5. The improvement according to claim 4, wherein the stonefruit is cherry.

6. The improvement according to claim 4, wherein the stonefruit is apricot.

7. The improvement according to claim 4, wherein the stonefruit is plum.

8. The improvement according to claim 4, wherein the stonefruit is prune.

9. The improvement according to claim 4, wherein the stonefruit is jujube.